Figure 1:
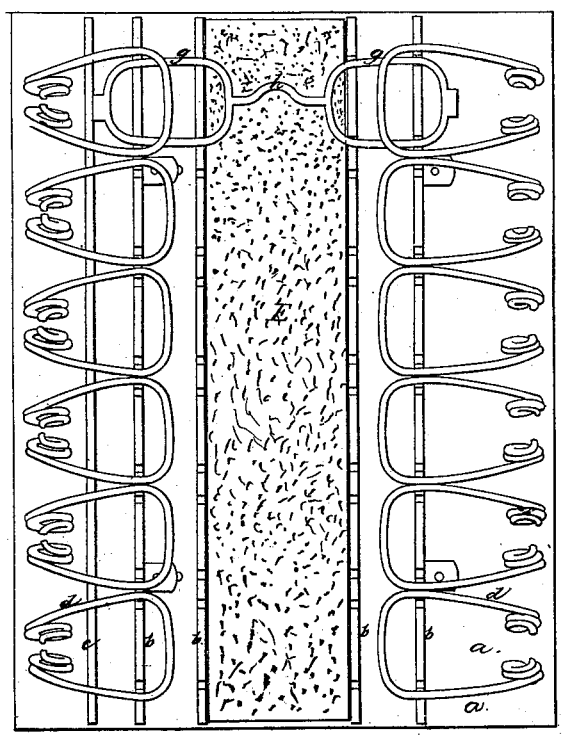
Figure 2:
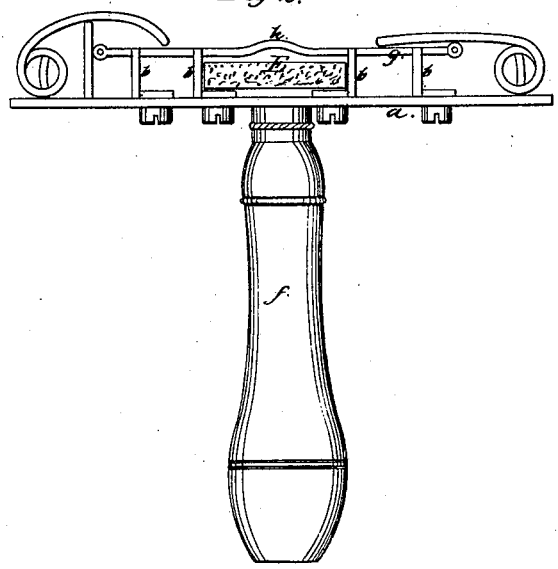

G. N. CUMMINGS.
SOLDERING SPECTACLES.

No. 16,470.  Patented Jan. 27, 1857.

UNITED STATES PATENT OFFICE.

GEORGE N. CUMMINGS, OF HARTFORD, CONNECTICUT.

IMPROVED CLAMP FOR SOLDERING SPECTACLES.

Specification forming part of Letters Patent No. 16,470, dated January 27, 1857.

*To all whom it may concern:*

Be it known that I, GEORGE N. CUMMINGS, of Hartford, county of Hartford, and State of Connecticut, have invented a new and useful Improvement in Clamps for Soldering Spectacles; and I do hereby declare that the same, as described and represented in the following specification and drawing, sufficient to enable others skilled in the art to make and use it.

I will proceed to describe the construction and operation, referring to the drawing, in which the same letters indicate like parts in each of the figures.

The nature of my improvement consists in arranging stationary or movable strips, placed edgewise at suitable distance apart, upon which are the parts comprising the spectacle-fronts, and held firmly in the desired shape when once put in the right position, by the use of springs so arranged as to bear upon each of the eye-pieces while the soldering is being done, and having fire-brick or soapstone placed between the strips and underneath the parts to be soldered, designed for a non-conductor of heat to the frame-work while the soldering is being done.

In the accompanying drawing, a is the frame-work or plate, upon which are arranged the following described parts, comprising and forming part of my improvement: b are movable or stationary strips, placed at proper distance apart, to form bearers or supports for the eye-pieces. c is a strip on one side, against which the first tier of eye-pieces are placed. d are springs, which hold the work in the desired position; e, the fire-brick or soapstone, the object of which is to protect the frame or plate from heating while the soldering is being done. f is the handle by which it is held or used to bring the blaze to any desired point.

In using my improved clamps I first place the eye-pieces g upon the movable or stationary strips b, and underneath the springs d, and push them back against the strips c. Then place the eye-pieces upon the strips and underneath the springs d on the opposite side in the same manner, and adjust the nose-pieces h to the eye-pieces g, so as to give them the shape it is desired they should have when soldered. The usual way the above work is done by all spectacle-manufacturers is by the use of the bow-spring for clamping the eye-pieces against the ends of the nose-pieces. By so doing it will be seen at once that as the heat is applied the nose-pieces will become limber and bend out of shape from the effects of the heat, and not unfrequently the springs relax their grip and fall apart; but it always becomes necessary that they should be handled over and shaped after the soldering is done, and in so doing they are liable to break and otherwise injure the work.

By the use of my improved clamps I not only save the extra amount of labor, waste of stock necessarily consumed by the slow, forbidding, or repulsive process, but I greatly facilitate the work and produce a stronger and more durable article, and at less expense.

I claim—

The use of the supporting-strips b c, springs d, and brick e, arranged and operating in the manner and for the purpose herein set forth.

GEO. N. CUMMINGS. [L. S.]

Witnesses:
JEREMY W. BLISS,
HENRY FRANCIS.